United States Patent
Romanzi, Jr.

[15] 3,635,420
[45] Jan. 18, 1972

[54] SEAT BELT RETRACTOR

[72] Inventor: Louis Romanzi, Jr., Brighton Township, Livingston County, Mich.

[73] Assignee: Irvin Industries Inc., Lexington, Ky.

[22] Filed: Jan. 15, 1970

[21] Appl. No.: 3,087

[52] U.S. Cl. ................................................242/107.4
[51] Int. Cl. .................................................A62b 35/00
[58] Field of Search ..........242/107 SB, 107.4, 107.5, 107.6; 297/386, 388, 389; 280/150 SB; 192/16

[56] References Cited

UNITED STATES PATENTS

| 715,424 | 12/1902 | Sawyer | 192/16 |
| 3,348,789 | 10/1967 | Hirsch | 242/107.4 |
| 3,412,952 | 11/1968 | Wohlert et al. | 242/107.4 |
| 3,446,454 | 5/1969 | Kovacs et al. | 242/107.4 |
| 3,450,368 | 6/1969 | Glauser et al. | 242/107.4 |
| 3,471,100 | 10/1969 | Arcari | 242/107.4 |
| 3,476,333 | 11/1969 | Weman | 242/107.4 |

Primary Examiner—Stanley N. Gilreath
Assistant Examiner—Werner H. Schroeder
Attorney—Rommel & Rommel

[57] ABSTRACT

A seat belt retractor having a rotatable reel; a clutch including a first member manipulative for blocking locking action of a pawl with a ratchet wheel on initial protraction of the belt, a land portion which permits locking action of the pawl with the ratchet wheel on partial rewind of the belt and a second member manipulative to hold the pawl away from the ratchet wheel during retraction of the belt.

4 Claims, 16 Drawing Figures

INVENTOR,
LOUIS ROMANZI, JR.
BY Rommel and Rommel
ATTORNEYS

INVENTOR,
LOUIS ROMANZI, JR.
BY Rommel and Rommel
ATTORNEYS

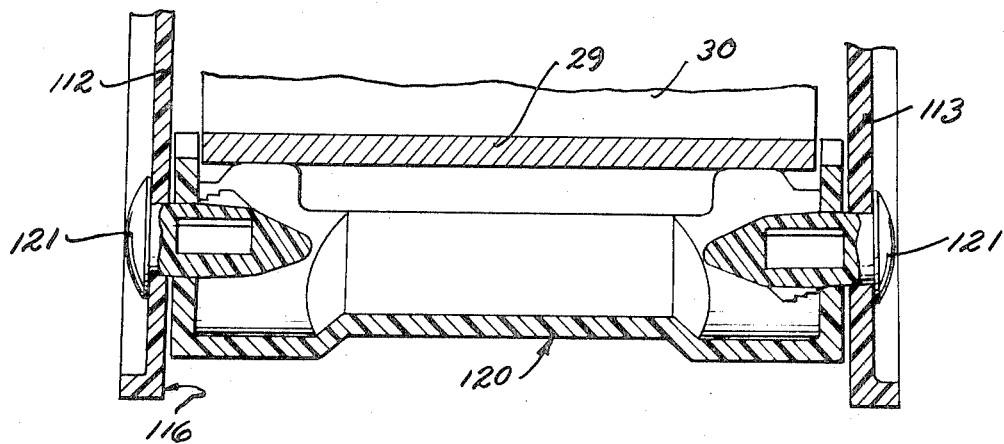
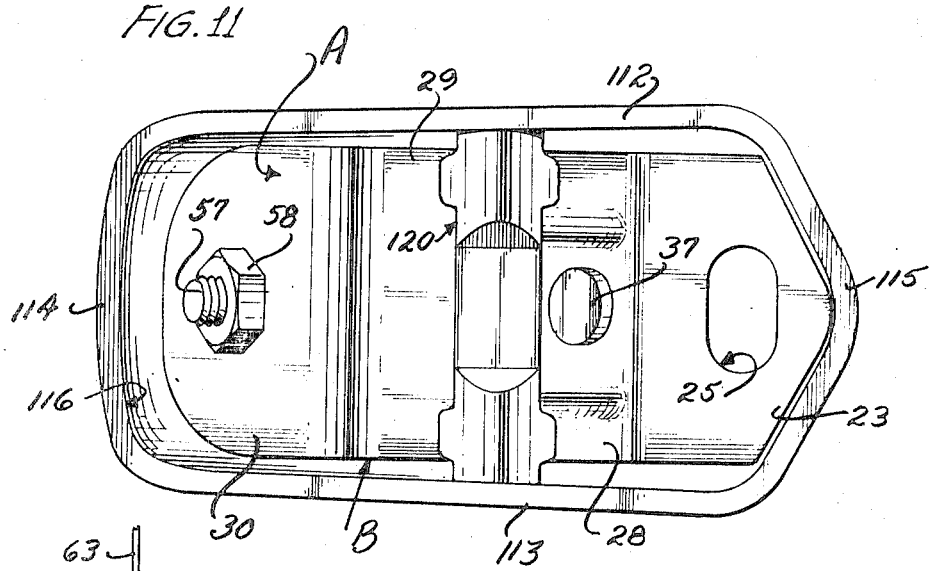
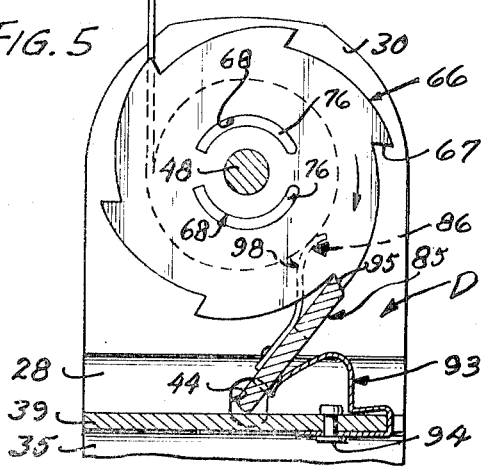
INVENTOR,
LOUIS ROMANZI, JR.
BY *Rommel and Rommel*
ATTORNEYS

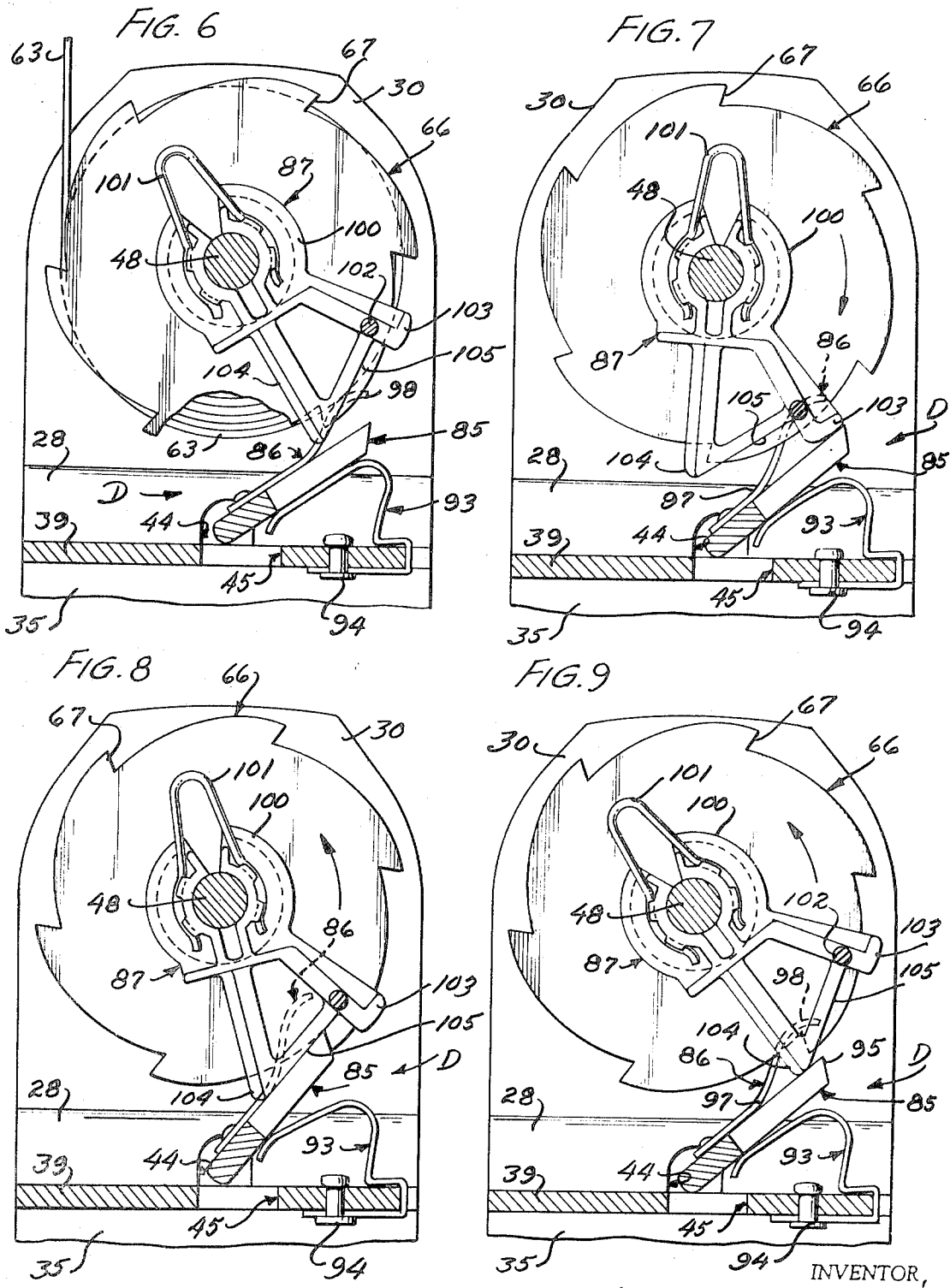

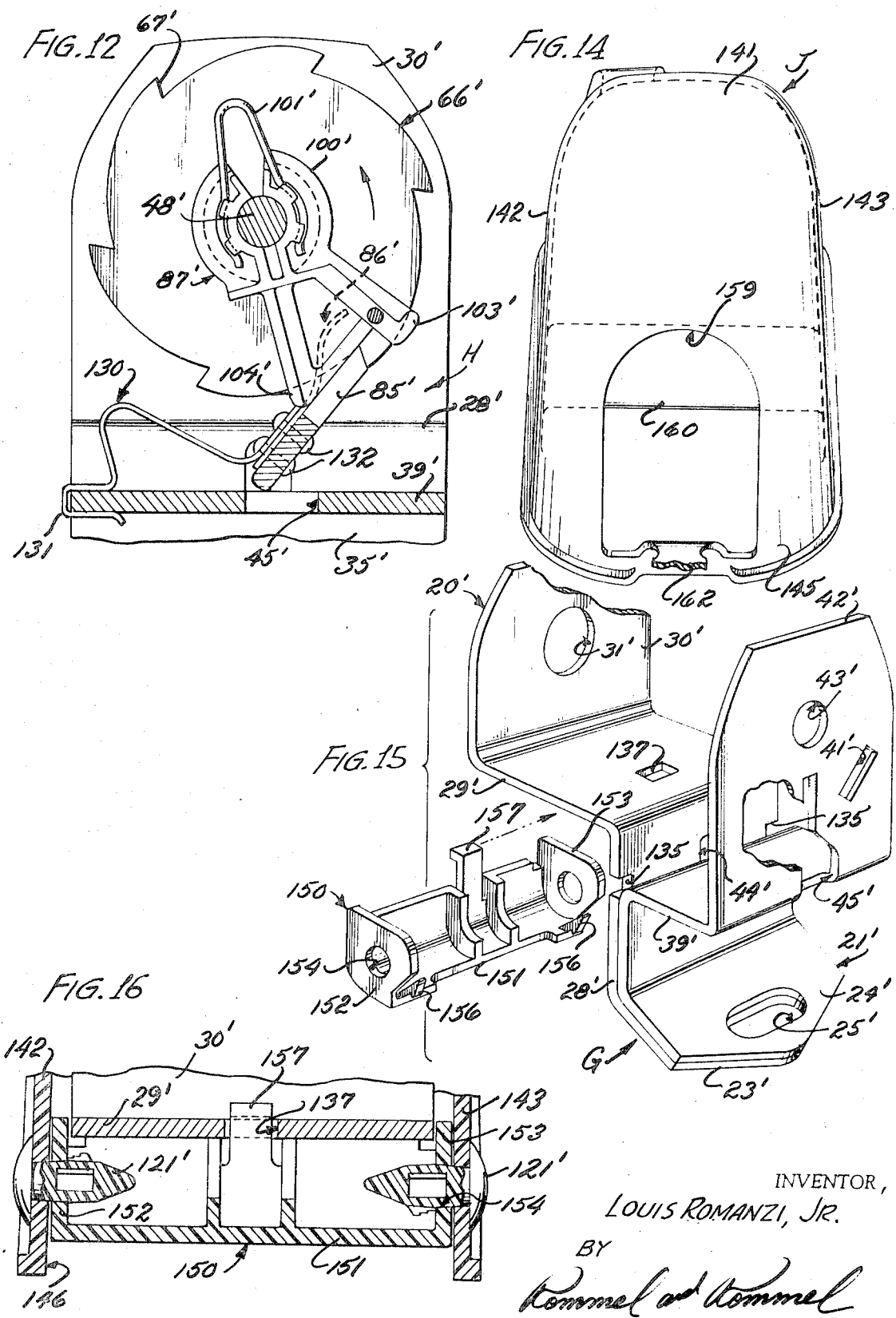

INVENTOR,
LOUIS ROMANZI, JR.

SEAT BELT RETRACTOR

This invention relates to improvements in seat belt retractors and covers therefor.

It is an object of the present invention to provide an improved seat belt of the type known as "automatic locking retractors," and in which the shaft is rotatably mounted on the frame of the retractor so that the shaft and reel rotate as a single unit.

A further object of the invention is the provision of an improved clutch for "automatic locking retractors," in which the clutch is mounted on a rotatable shaft and is in frictional engagement therewith for manipulative movement to a first position in blocking locking action of a pawl with a ratchet wheel on initial protraction of belting therefrom; manipulative to a second position to release the blocking action against the pawl and permit locking engagement of the pawl with the ratchet wheel to prevent further protraction of belt therefrom on partial retraction of the belts; and manipulative to a third position to hold the pawl away from the ratchet wheel during retraction of the belt.

Other objects and advantages of the invention will become apparent during the course of the following detailed description, taken in connection with the accompanying drawings, forming a part of this specification, and in which drawings:

FIG. 5 is a sectional view taken substantially on the line 5—5 of FIG. 2.

FIGS. 6, 7, 8 and 9 are sectional views taken substantially on the line 6—6 of FIG. 2, with the cover removed, and showing different stages of the operation of my improved retractor.

FIG. 10 is a sectional view taken substantially on the line 10—10 of FIG. 2.

FIG. 11 is a bottom plan view of the retractor.

FIG. 12 is a view similar to FIG. 8 and showing a modified form of pawl spring.

FIG. 14 is a side view of the modified cover of FIG. 13.

FIG. 15 is an exploded perspective view of the modified frame and cover of FIG. 13.

FIG. 16 is an enlarged sectional view taken substantially on the line 16—16 of FIG. 13.

Figure 1:
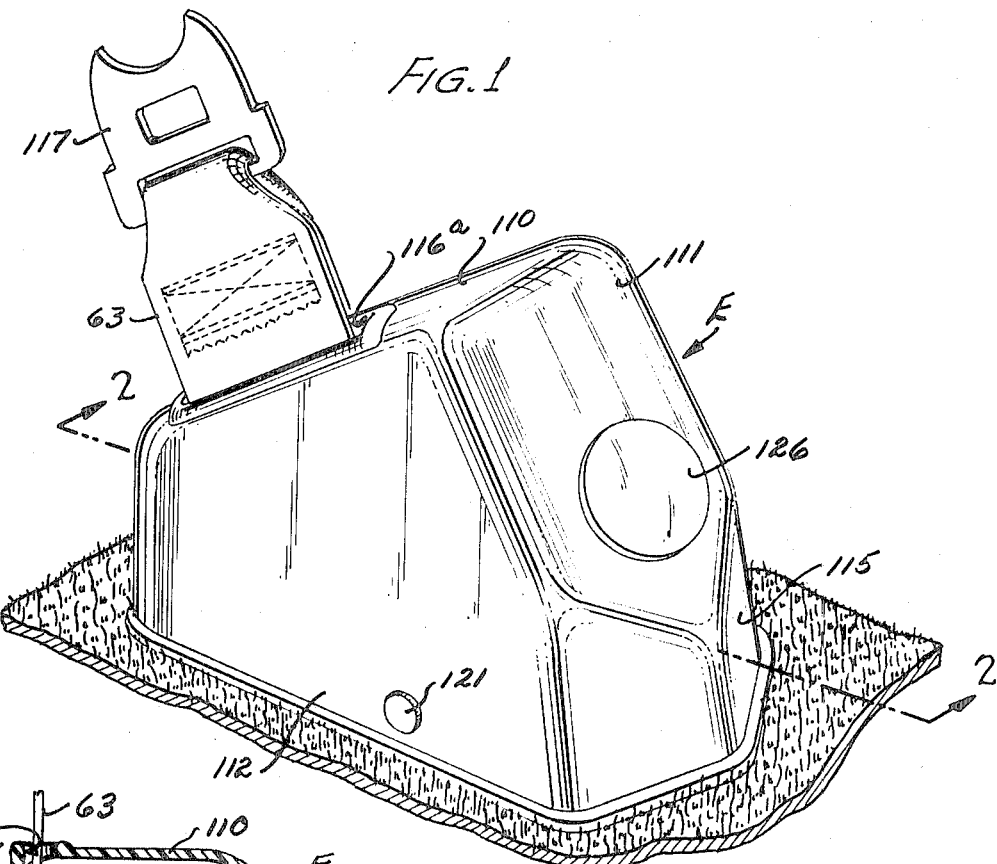
FIG. 1 is a perspective view of my improved seat belt retractor showing the same attached to a vehicle.
Figure 3:
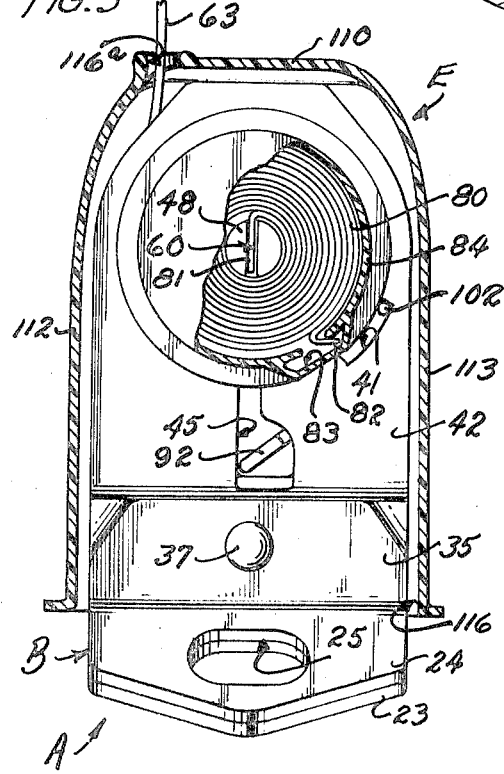
FIG. 3 is a sectional view taken substantially on the line 3—3 of FIG. 2.
Figure 4:
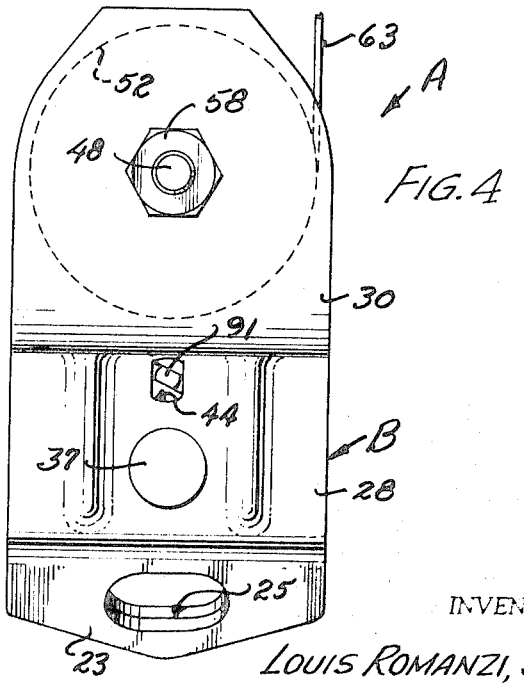
FIG. 4 is a sectional view taken substantially on the line 4—4 of FIG. 2, with the cover removed.

In the drawings, wherein for the purpose of illustration is shown a preferred embodiment of the invention, and wherein similar reference characters designate corresponding parts throughout the several views, the letter A may generally designate my improved retractor as shown in FIGS. 1–11, and which may include a frame B, reel unit C, and stop means D, and may have a cover E; and F the modified retractor as shown in FIGS. 12–16, and which may include a modified frame G, stop means H and may have a modified cover J.

Figure 2:
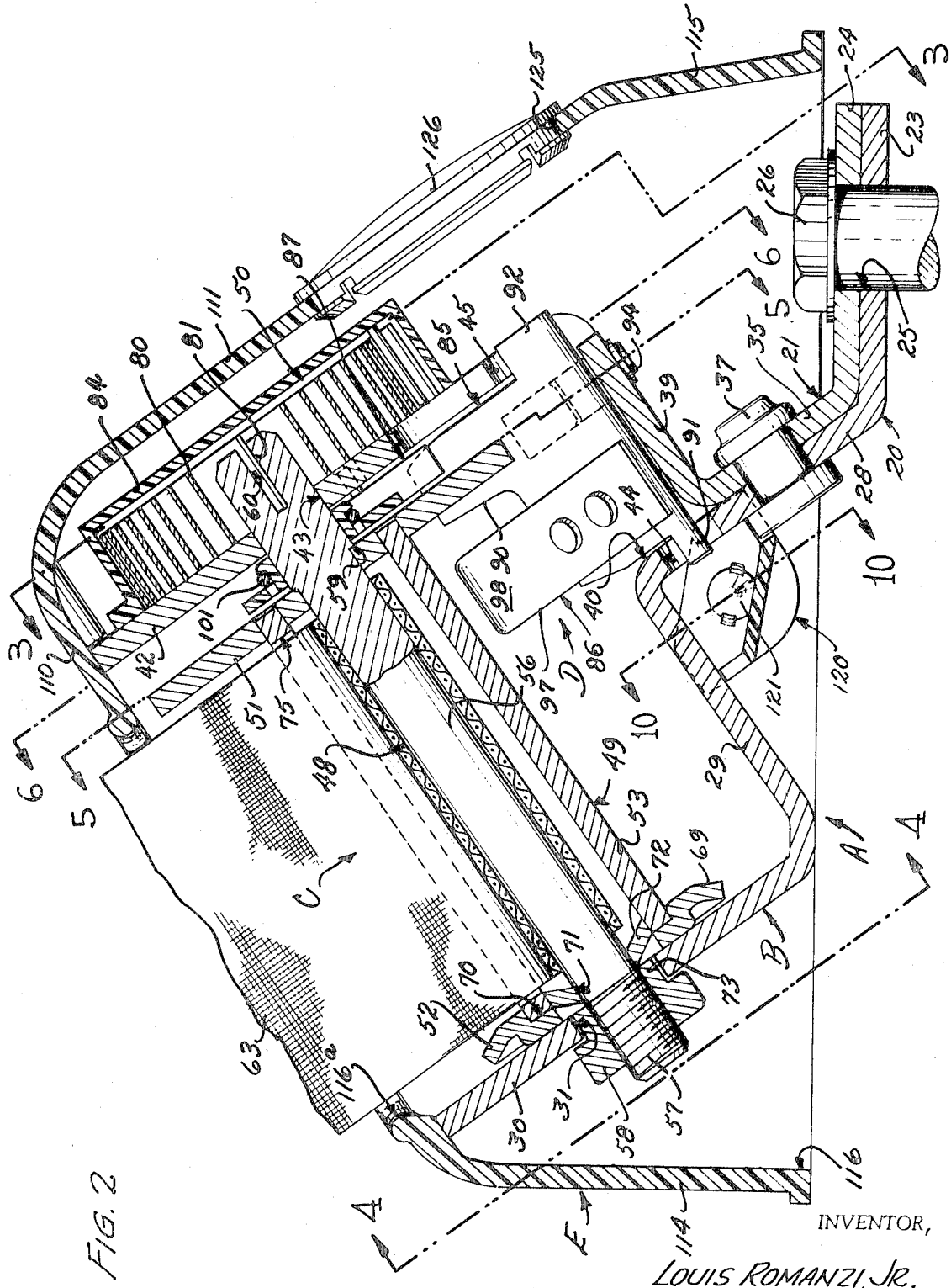
FIG. 2 is an enlarged sectional view taken substantially on the line 2—2 of FIG. 1.

Frame B, as may be best seen in FIG. 2, preferably comprises a pair of bracket sections 20 and 21 having respective lower portions 23 and 24, portion 24 overlying portion 23 and in abutment therewith, each including an opening 25 through both lower portions which may receive a bolt or other fastener 26 for attachment of the retractor to a vehicle.

Bracket 20 has an upwardly angled leg 28 extending from lower portion 23 thereof, a portion 29 extending downwardly at substantially a 90° angle from the uppermost end of leg 28, and an upstanding flange portion 30 extending at substantially a 90° angle upwardly from the lowermost end of portion 29. Flange 30 is provided with an opening 31 for receiving a portion of reel unit C, as will be subsequently described.

Bracket member 24 includes a leg portion 35 extending angularly upwardly from lower portion 24, the same overlying and being in abutment with leg portion 28 of bracket member 20. Bracket members 20 and 21 may be attached together such as by a rivet or other fastener 37 interconnecting their respective leg portions 28 and 35. Extending from the uppermost end of leg portion 35 may be an upwardly and outwardly extending portion 39, extending away from leg portion 28 of bracket 20 intermediate the length thereof, and providing a channel 40 within which may be mounted stop means D, as will be subsequently described. Flange portion 42 of bracket member 21 extends from the outermost end of portion 39. Flange portions 30 and 42 comprise spaced apart flanges for receiving therebetween reel unit C, as will be subsequently described. Flange 42 may be provided with a substantially centrally disposed opening 43 for receiving a shaft which supports reel unit C, as will be subsequently described. Flange 42 may also be provided with an elongated slot 41 which cooperates with stop means D, as will be subsequently described.

Opposed portions of leg portion 28 of bracket 20 and flange 42 of bracket 21 may be respectively provided with openings 44 and 45, to opposite sides of channel 40, for pivotally supporting a portion of stop means D, as will be subsequently described.

Reel unit C preferably includes a rotatable shaft 48, reel 49 and spring means 50. Reel 49 may include first end member 51, second end member 52, and a tubular hub 53 extending between first end and second end members 51 and 52.

Shaft 48 preferably comprises an elongated body portion 56 which has threads 57 at one end thereof for receiving a nut 58 in rotatable attachment of one end of shaft 48 to flange 30 of bracket 20. The opposite end of shaft 48 may be provided with an offset end portion 59 for abutment with first end member 51 in spacing the same apart from flange 42 of bracket 21. The outermost end of shaft 48 is provided with an elongated slot 60 which may cooperate with spring means 50, as will be subsequently described.

First end member 51 is spaced apart from second end member 52, tubular hub 53 being mounted therebetween, for receiving a belt 63 wound thereabout. First end member 51 may comprise merely an end of the reel. However, in the form illustrated, first end member 51 preferably comprises a ratchet wheel 66 having a plurality of teeth 67 about the periphery thereof, and which forms a part of stop means D, as will be subsequently described. First end member 51 is preferably provided with a plurality of spaced apart slots 68 which define sockets for receiving a portion of tubular hub 53, as will be subsequently described.

Second end member 52 preferably comprises a ring or disclike body portion 69 provided with a circular recess 70 for receiving one end of tubular hub 53. An opening 71 is provided centrally of body portion 69 and a plurality of offset members 72 are provided extending between recess 70 and opening 71. As shown, shank 73 of nut 58 abuts end member 52, clamping the same toward hub 53 which is urged toward end member 51 which engages shoulder 59 of shaft 48, end members 51 and 52 and hub 53 thus rotating together and with shaft 48.

Tubular hub 53 preferably comprises a conventional reel hub having an elongated slot 75 through which belt 63 may be fed for wrapping engagement about shaft 48. As previously described, one end of tubular hub 53 is received within recess 70 of second end member 52, the opposite end of tubular hub 53 being provided with a plurality of flanges 76 which are received within sockets 68 of first end member 51, so that first end member 51 rotates with tubular hub 53, second end member 52 and shaft 8.

As shown in FIG. 2, reel unit C is preferably mounted on brackets 20 and 21 with opposite ends of shaft 48 extending through respective openings 31 and 43 of flanges 30 and 42, first end member 51 abutting against offset portion 59 of shaft 48.

Spring means 50 preferably comprises a spiral spring 80, one end 81 of which is received within slot 60 of shaft 48, the other end 82 thereof being received within a socket 83 which may be provided in a cover plate 84 which may be attached to flange 42 and which protects spiral spring 80.

Spiral spring 80 is preferably loaded in a direction to cause retraction of belt 63 and will become even further loaded for such retraction on protraction of belt 63 from the retractor.

Stop means D preferably includes ratchet wheel 66, a pawl 85, belt follower means 86 mounted on pawl 85, and clutch means 87.

Pawl 85 preferably comprises a somewhat elongated body portion 90 having endmost extensions 91 and 92 which may be respectively received within openings 44 and 45 of brackets 20 and 21 for pivotal movement of pawl 85 with respect thereto. Spring means 93 is preferably mounted on outwardly extending portion 39 of bracket member 21, such as by a rivet 94, and abuts against pawl 85 in urging the outermost end 95 of body portion 90 in a direction for locking engagement with ratchet wheel 66, as shown in FIG. 5.

Belt follower means 86 preferably comprises a fingerlike body portion 97 having an outermost end 98 which is spaced apart from outermost end 95 of pawl 85, in a direction toward tubular hub 53. As is shown in FIG. 6, belt follower means 86 is provided for abutment with the belting when it is substantially fully wound on reel unit C, for holding pawl 85 away from ratchet wheel 66.

Clutch means 87 preferably comprises a split ring type of body portion 100 which is mounted on shaft 48 and is held in frictional engagement therewith by spring means 101. Body portion 100 is provided with a lug 102 which may be received within slot 41 of bracket member 21 in limiting rotational movement of clutch means 87.

Body portion 100 preferably includes a first leg portion 103, second leg portion 104, and an intermediate land portion 105.

First leg portion 103 is preferably positioned for manipulative blocking action of pawl 85 with ratchet wheel 66 on initial protraction, as shown in FIG. 7. Second leg portion 104 is provided for manipulative rotative action to hold pawl 85 away from ratchet wheel 66 during retraction, and land portion 105 permits abutment and locking action of pawl 85 with ratchet wheel 66 to prevent further protraction of belt 63 after the same has been adjusted about the lap of a wearer.

The general operation of retractor A will be best understood by reference to FIGS. 6, 7, 8 and 9.

FIG. 6 shows the retractor in an at rest, fully, retracted position. The retractor having rotated to a retracted position, clutch means 87 will be in a rotative position with second leg portion 104 thereof most closely adjacent pawl 85. The buildup of belting about reel 49 will, however, be such as to abut against belt follower means 86 of pawl 85 and hold pawl 85 away from clutch means 87 a sufficient distance to permit manipulation of clutch means 87, on rotation thereof by protraction of belt 63, so that leg portion 103 thereof may rotate to block engagement of pawl 85 with ratchet wheel 66, as shown in FIG. 7.

Stop means D will remain in position as shown in FIG. 7 during protraction of belt 63. After the belt has been protracted, the seat belt buckle (not shown) attached and the belt released, a partial retraction of the belt will occur as the belt is adjusted snugly over the lap of the wearer. This partial retraction will cause rotation of clutch means 87 to a position as shown in FIG. 8.

In the position shown in FIG. 8, first leg 103 has moved away from pawl 85, spring means 93 urging pawl 85 into engagement with land portion 105 of clutch means 87, which permits engagement of pawl 85 with ratchet wheel 66 in preventing further protraction of belt 63.

When the seat belt buckle is released and retractor A permitted to retract belt 63, second leg portion 104 of clutch means 87 will rotate to position of abutment with pawl 85 to hold the same away from ratchet wheel 66, as shown in FIG. 9. This avoids the usual clicking of pawl 85 over teeth 67.

Of course, if retraction is stopped prior to engagement of belt on reel 49 with belt sensing means 86, and protraction attempted, clutch means 86 will rotate to a position as shown in FIG. 8 which will stop protraction.

It is to be noted that, after initial protraction, and after partial retraction, first leg portion 103 of clutch means 87 is blocked by pawl 85 from thereafter blocking engagement of pawl 85 with ratchet wheel 66.

Cover E preferably comprises an open ended shell having a somewhat pyramidal-shaped top having angled sides 110 and 111, depending side portion 112 and 113, depending end portions 114 and 115, and is open at one end 116 thereof. Cover E is mounted over retractor A as shown in FIG. 2.

Top side portion 110 preferably includes an elongated slot means 116$^a$ through which belt 63 may pass. This slot 116$^a$ is preferably restricted so that belt 63 may pass therethrough, but the overlapped end portion of belt 63, where it is attached to such as a belt receiving tongue 117, will be stopped thereby, providing an end of the belt extendant from cover E which may be readily grasped by an occupant of the vehicle to which the same is attached.

Frame B of the retractor is preferably secured within cover E by a closure means 120. This closure means may comprise an elongated shield, as best shown in FIG. 10, which may extend in abutment with portions 28 and 29 of bracket 20, over opening 44 of leg 28, and may serve to protect the retractor from accumulation of lint, fuzz, etc., from the vehicle floor rug to within the working parts of the retractor.

Closure means 120 may be attached to depending side portions 112 and 113 of cover E, such as by attaching means 121, in attachment together of retractor A and cover E as an integral unit. Attaching means 121 may comprise fasteners of the type which require substantial destruction of the fastening interconnection in order to be removed. In the mounting of retractors in vehicles by the manufacturer, it has been found that purchasers may remove the retractors, tamper with them, causing inoperativeness thereof, and then complain to the manufacturer about such inoperativeness. By providing the retractor and cover as a unit, in a manner which prevents ready access to the retractor, the manufacturer will be able to tell, by destruction of attaching means 121, whether or not the cover has been removed and the retractor tampered with.

Inasmuch as the retractor and cover are adapted to be installed in a vehicle as a unit, top side portion 111 is preferably provided with an enlarged opening 125 for insertion of tools in securing of bolt 26 through brackets 20 and 21 in attachment of the retractor to a vehicle. A cover 126 may be provided for insertion within opening 125 in providing a closed cover unit.

Referring to the modified form F, as shown in FIGS. 12–16, many of the parts thereof are identical to form A and thus bear reference characters identical to those used in connection with form A, with the addition of a prime character.

Referring first to FIG. 12, by comparison with FIG. 8, it will be observed that stop means H of retractor F includes a modified spring means 130. In this form, spring means 130 preferably includes a substantially U-shaped clamping portion 131 for attachment thereof to portion 39' of frame G, the other end of spring means 130 being attached to pawl 85' such as by the same rivets 132 which may secure belt follower means 86' to pawl 85'. In this form of the invention, pawl 85' is thus urged toward ratched wheel 66' by a pulling force rather than by a pushing force as shown in form A.

It is obvious that spring means 130 of form F could be used in place of spring means 93 of form A, and vice versa.

As will be subsequently described, the only basic difference between forms A and F is a modification of frame G to receive a modified cover J.

Modified frame G is preferably provided with closure attaching means which may comprise a pair of endmost notches 135 on upwardly angled leg 28' at approximately the point of divergence therefrom of portion 39' of bracket section 21'; and a slot 137 centrally disposed on portion 29' of bracket 20'. Notches 135 and slot 137 comprise closure attaching means for receiving modified cover J, as will be subsequently described.

Figure 13:
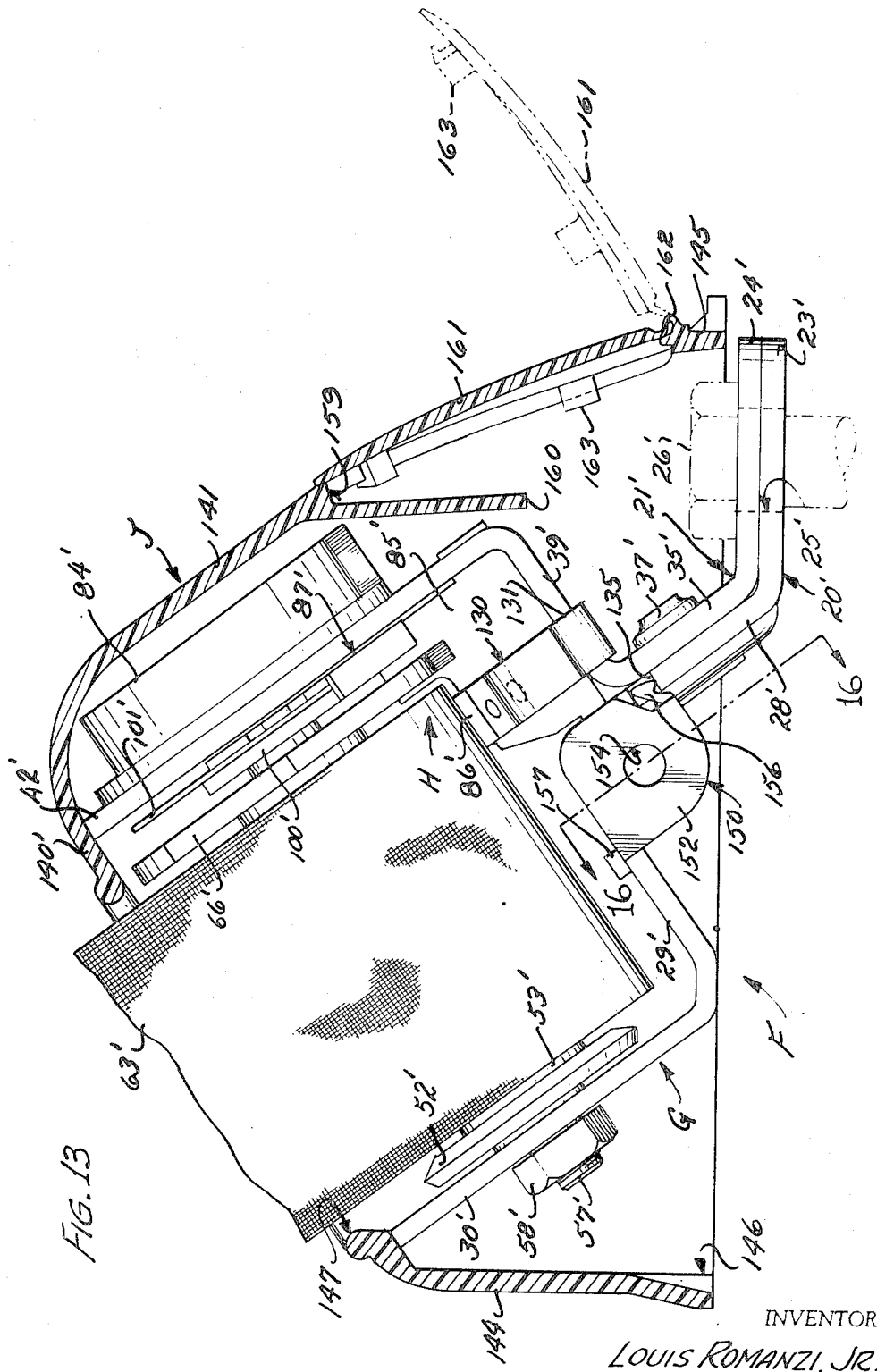
FIG. 13 is a view similar to FIG. 2 and showing a retractor having a modified frame and cover, and which may include the modified pawl spring of FIG. 12.

Cover J preferably comprises an open ended shell having a somewhat pyramidal shaped top having angled sides 140 and 141, depending side portions 142 and 143, depending end portions 144 and 145, and is open at one end 146 thereof. Cover J is mounted over retractor F as shown in FIG. 13.

Top side portion 140 preferably includes an elongated slot means 147 through which belt 63' may pass. This slot 147 is preferably restricted so that belt 63' may pass therethrough, but the overlapped end portion of belt 63', where it is attached to such as a belt receiving tongue will be stopped thereby, providing an end of the belt extended from cover J which may be readily grasped by an occupant of the vehicle to which the same is attached.

Frame G of the retractor is preferably secured within cover J by a closure means 150. This closure means may comprise an elongated shield as best shown in FIG. 15, which may extend in abutment with portions 28' and 29' of bracket 20', over opening 44' of leg 28', and may serve to protect the retractor from accumulation of lint, fuzz, etc., from the vehicle floor rug to within the working parts of the retractor.

Closure means 150 preferably includes an elongated body portion 151 of somewhat semicircular transverse cross section and having a pair of end pieces 152 and 153 which are each provided with an aperture 154. One side of body portion 151 may be provided with a pair of spaced apart hooklike members 156, one adjacent each end piece 152 and 153, and the other side of body portion 151 may be provided with a substantially centrally located hooklike flange member 157. Members 156 and 157 comprise frame attaching means for preassembled attachment of cover J to frame G. As shown in FIG. 13, closure means 150 is attached to bracket 20' by insertion and locking of hooklike member 157 within slot 137 and interengagement of hooklike members 156 within notches 135. Thus, closure means 150 may be preassembled to the retractor frame.

Closure means 150 may be attached to depending side portions 142 and 143 of cover J such as by attaching means 121' of the same type as were used in connection with form A of the invention.

Inasmuch as the retractor and cover are adapted to be installed in the vehicle as a unit, top side portion 141 may be provided with an enlarged opening 159 for insertion of tools in securing of bolt 26' through brackets 20' and 21' and attachment of retractor F to a vehicle. In order to insure that the bolt driving tool which may be inserted through opening 159 does not abut against and possibly cause damage to retractor F, cover J may be provided with a depending flap portion 160 adjacent opening 159. A cover member 161 may be preferably hingedly attached to side 145 such as by a flexible hinge 162 to provide a closure for opening 159. Cover 161 may be provided with flange members 163 for securing of the same in a closed position by engagement therewith with the edges of opening 159.

Various changes may be made to the forms of the invention herein shown and described without departing from the spirit of the invention or the scope of the following claims.

I claim:

1. A seat belt retractor including a frame, a shaft rotatably mounted on said frame and including a reel portion, a belt attached to said reel portion for protraction and retraction with respect thereto, a ratchet wheel mounted on said shaft for rotation therewith, a pawl pivotally mounted on said frame for engagement with said ratchet wheel, spring means for urging said pawl into engagement with said ratchet wheel, belt web follower means mounted on said pawl for holding said pawl out of engagement with said ratchet wheel under substantially full rewind conditions of said belt, and clutch means mounted on said shaft, said clutch means including a body portion in frictional engagement with said shaft for partial rotation therewith, stop means for limiting rotation of said body portion, a first leg portion positioned for manipulative rotation into abutment with said pawl to prevent engagement thereof with said ratchet wheel on initial protraction of said belt from said reel and rotation of said body portion in accordance with such protraction, a land portion adjacent said first leg portion which permits said pawl to engage said ratchet wheel on partial rotation of said shaft in the opposite direction of rotation from that of protraction of said belt and after substantial protraction of said belt, to prevent further protraction of said belt, and a second leg portion engageable with said pawl on rewind rotation of said reel to hold said pawl away from said ratchet wheel.

2. A seat belt retractor as specified in claim 1 wherein said body portion of said clutch means comprises a split ring frictionally engaging said shaft, said clutch means including spring means attached to said body portion for urging said split ring into frictional engagement with said shaft.

3. A seat belt retractor including a frame, a reel unit rotatably mounted on said frame, and stop means for preventing further protraction of said belt after initial protraction and partial rewind retraction thereof, said stop means including a ratchet wheel mounted for rotatable movement with said reel unit, a pawl mounted on said frame for engagement with said ratchet wheel in preventing rotation of said reel and in a direction for protraction of belt from said reel unit, and clutch means operably engageable with said reel unit for limited rotation in accordance with rotation of said reel unit, said clutch means including a first portion for blocking engagement of said pawl with said ratchet wheel, said first portion being normally out of engagement with said pawl under full rewind condition of the retractor, said clutch means being rotatable on rotation of said reel unit in initial protraction of the belt to a position so that said first portion moves behind and abuts said pawl and blocks engagement of said pawl with said ratchet wheel and rotatable on partial retraction of the belt to a position so that said first portion moves out of blocking engagement with said pawl, said first portion of said clutch means and said pawl being constructed and arranged so that said pawl prevents said first portion of said clutch means from blocking engagement therewith under conditions of further protractive pull on the belt after initial protraction and partial retraction thereof, said clutch means including a second portion which permits said pawl to engage said ratchet wheel, said clutch means being rotatable on rotation of said reel unit on partial retraction of the belt after initial protraction thereof to a position so that said second portion of said clutch means permits engagement of said pawl with said ratchet wheel in preventing further protraction, and said clutch means including a third portion engageable with said pawl for lifting the same way from engagement with said ratchet wheel, said clutch means being rotatable on rotation of said reel unit in extended retraction of the belt to a position so that said third portion of said clutch means engages said pawl and lifts the same from engagement with said pawl, said clutch means being further rotatable on rotation of said reel unit in a direction for further protraction of said belt after such extended retraction of said belt and prior to substantially full rewind retraction thereof to a position so that said second portion of said clutch means permits engagement of said pawl with said ratchet wheel in preventing further protraction of the belt.

4. A seat belt retractor including a frame, a reel unit rotatably mounted on said frame, and stop means for preventing further protraction of said belt after initial protraction and partial rewind retraction thereof, said stop means including a ratchet wheel mounted for rotatable movement with said reel unit, a pawl mounted on said frame for engagement with said ratched wheel in preventing rotation of said reel and in a direction for protraction of belt from said reel unit, and clutch means operably engageable with said reel unit for limited rotation in accordance with rotation of said reel unit, said clutch means including a first portion for blocking engagement of said pawl with said ratchet wheel, said first portion being normally out of engagement with said pawl under full rewind condition of the retractor, said clutch means being rotatable on rotation of said reel unit in initial protraction of the belt to a position so that said first portion moves behind and abuts said pawl and blocks engagement of said pawl with said ratchet wheel and rotatable on partial retraction of the belt to a position so that said pawl moves out of blocking engagement with said pawl, said first portion of said clutch means and said pawl being constructed and arranged so that said pawl prevents said first portion of said clutch means from blocking engagement therewith under conditions of further protractive pull on the belt after initial protraction and partial retraction thereof, said clutch means including a second portion which permits said pawl to engage said ratchet wheel, said clutch means being rotatable on rotation of said reel unit on partial retraction of the belt after initial protraction thereof to a position so that said second portion of said clutch means permits engagement of said pawl with said ratchet wheel in preventing further protraction of the belt, said pawl including belt follower means mounted thereon for abutting against the belt on said reel unit under conditions of substantially full rewind retraction and moving said pawl away from said ratchet wheel a sufficient distance to permit said first portion of said clutch means to move behind said pawl to abut said pawl and block engagement of said pawl with said ratchet wheel on rotation of said reel unit in initial protraction of the belt, and said clutch means including a third portion engageable with said pawl for lifting the same away from engagement with said ratchet wheel, said clutch means being rotatable on rotation of said reel unit in extended retraction of the belt to a position so that said third portion of said clutch means engages said pawl and lifts the same from engagement with said pawl, said clutch means being further rotatable on rotation of said reel unit in a direction for further protraction of said belt after such extended retraction of said belt and prior to substantially full rewind retraction thereof to a position so that said second portion of said clutch means permits engagement of said pawl with said ratchet wheel in preventing further protraction of the belt.

* * * * *